July 17, 1951 A. ROGERS 2,561,316
REDUCING AND CUTOFF VALVE FOR HEATING SYSTEMS
Filed Dec. 30, 1947 2 Sheets-Sheet 1

Inventor:
Alden Rogers,
by Spear&Spear Attorneys

Inventor:
Alden Rogers,
by Spear & Spear Attorneys

Patented July 17, 1951

2,561,316

UNITED STATES PATENT OFFICE 2,561,316

REDUCING AND CUTOFF VALVE FOR HEATING SYSTEMS

Alden Rogers, New Haven, Conn., assignor to Anna F. Wheeler, Malden, Mass.

Application December 30, 1947, Serial No. 794,471

4 Claims. (Cl. 50—10)

My present invention relates to a control for a heating system having a reducing valve establishing high and low pressure sides thereof.

In such systems, a real problem exists in providing efficient and reliable adjustable means to operate the reducing valve automatically to admit steam at a pressure determined as adequate to meet existing heating requirements and to close the valve when those heating requirements are satisfied. In practice, the reducing valves are generally so located that they can be serviced or adjusted only with considerable inconience. It is, accordingly, desirable that the control means for such a reducing valve be adapted to be conveniently stationed as, for example, near the steam gauges to provide a remote control therefor.

In accordance with this invention, I provide first and second control conduits and a third conduit connected thereto and to a pressure operable unit adapted to close the reducing valve against the action of means, such as weights, yieldably urging the reducing valve into its open position. The first control conduit is in communication with the high pressure side of the system and the second control conduit is in communication with the low pressure side thereof and is under the control of a valve, preferably thermostatically operated to close when a predetermined temperature is reached in a space heated by the system.

The first and second control conduits are provided with adjustable valve means which may be located remote from the reducing valve and regulated so that adequate steam pressure is delivered from the high pressure side to the pressure operable unit to render it effective to maintain the reducing valve in a desired open position. The valve means are also effective to so regulate the flow of steam through the bleeder line that such a pressure on the unit is maintained until the thermostat in control of the bleeder line valve is satisfied and causes that valve to close with the result that the pressure on the unit builds up until it is effective to overcome the opposition of the yieldable means and to close the reducing valve. The reducing valve remains closed until the thermostat establishes the demand for more heat.

In practice, my valve control for the first and second control conduits is such that when the valve in control of one of the conduits is moved towards its seat to decrease the steam flow therethrough, the other valve is simultaneously moved away from its seat to increase the steam flow through the other conduit. This has the advantage that when higher heat requirements exist, a lesser volume of steam is admitted to the pressure operable unit and a relatively greater volume of steam may flow through the bleeder line. As a consequence, a lower pressure is exerted on the pressure operable unit and the yieldable means open the reducing valve wider. When the heating requirements are relatively low, the operative position of the valve control is such as to admit a relatively larger volume of steam to the pressure operable unit and to permit a lesser volume of steam to pass to the low pressure side of the system through the bleeder line so that a higher pressure is exerted on the pressure operable unit to move the reducing valve towards its closed position.

In the accompanying drawings, I have shown an illustrative embodiment of my invention from which these and other of its novel features and advantages of my invention will be readily apparent.

Figure 1:
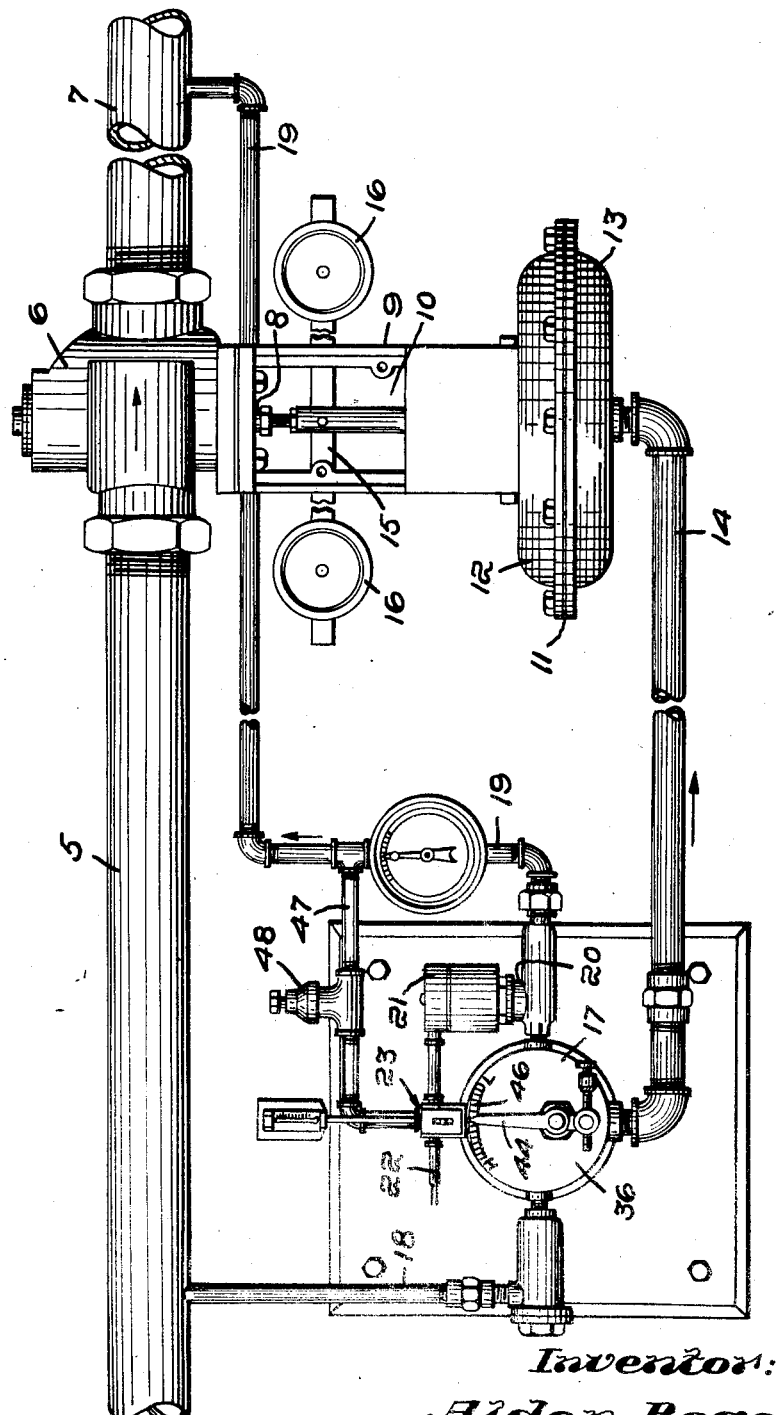
Fig. 1 is a fragmentary view of a heating system, the reducing valve of which is operated by a control in accordance with my invention.
Figure 2:
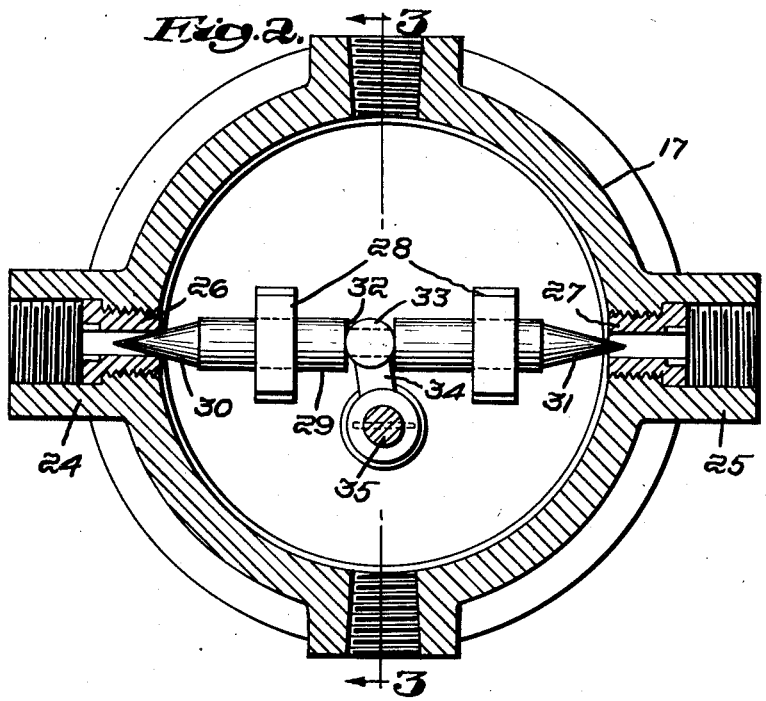
Fig. 2 is a section through the valve body on an enlarged scale.
Figure 3:
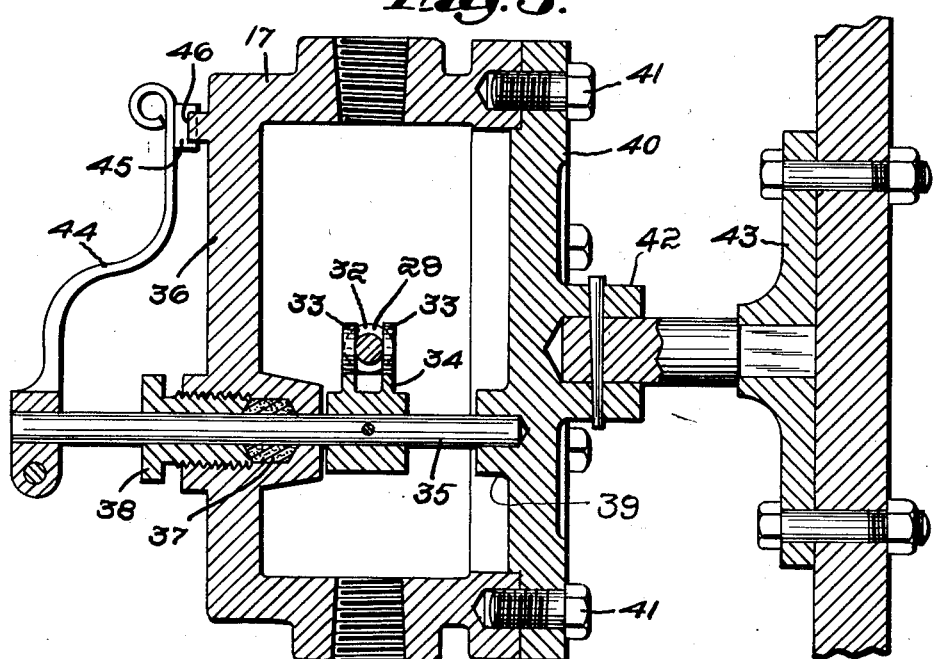
Fig. 3 is a section through the valve body along the lines 3—3 of Fig. 2.

In the drawings I have indicated at 5 the high pressure supply line of a heating system having a conventional reducing valve 6 and a low pressure feed line 7.

The reducing valve 6 has a stem 8 and a bracket 9. Secured to the stem 8 of the reducing valve 6 is the plunger 10 of a suitable pressure operable unit such as the diaphragm 11 clamped between casing sections 12 and 13. The casing section 12 is secured to the bracket 9 and a conduit 14 is in communication with the interior of the section 13. Pivotally secured to the plunger 10 and to the bracket 9 is a lever 15 under the control of adjustable weights 16.

At 17, I have indicated a valve body which may be located where desired, within reasonable limits, remotely from the reducing valve 6. The conduit 14 and the first and second control conduits 18 and 19 are in communication with the interior of the valve body 17. In the completed installation, suggested in Fig. 1, the conduit 18 is connected to the high pressure supply line 5 and the conduit 19, which is a bleeder line, is connected to the low pressure feed line 7 and is under the control of a normally closed valve 20 adapted to be opened by the solenoid 21, the circuit 22 for which includes a thermostatically operated switch, indicated generally at 23. Conveniently, the switch 23 may be mounted on the body 17.

The valve body 17 includes a pair of alined bosses 24 and 25 to which the control conduits 18 and 19, respectively, are connected. Threaded in the boss 24 and 25 are valve seat establishing members 26 and 27, respectively, and slidably supported as at 28 to aline therewith is a valve member 29 having at its ends the valve heads 30 and 31.

The central part of the valve member 29 is of reduced diameter as at 32 to receive the rounded ends 33 of the crank 34 which is fast on the shaft 35 extending through and rotatably supported by the front wall 36 of the body 17. Suitable packing 37 is held in place by the gland 38. At its inner end, the shaft 35 is centered by a recess in the boss 39 on the rear wall 40 of the body, tightly bolted as at 41 to the body 17. The rear wall 40 has a rearwardly extending boss 42 to which is rigidly secured the flanged mount 43 by which the body 17 may be easily mounted where desired.

At its outer end, the shaft 35 has an arm 44 having a locking element 45 disposed to enter between any pair of the arcuately disposed series of ridges 46 which establish indicia with reference to which the arm 44 is manually positioned to establish desired operating positions. As the arm 44 resiliently engages the ridges 46, accidental movement of the valve member 29 is impossible.

In the operation of my control, the weights 16 are first set for the highest steam pressure required on the low pressure side of the system. The indicator arm 44 is then moved relative to the indicia from the end marked H (high) towards the end marked L (low) until that pressure is obtained, i. e. until the weighted lever 15 is balanced. This results since steam under pressure, reduced by the valve head 30, is now delivered to the diaphragm 11 forcing its plunger 10 upwardly and opening the reducing valve 6 to the desired extent. As the valve 31 does not block the bleeder line 19, the required pressure on the diaphragm unit is maintained until the thermostat is satisfied and its switch opens enabling the valve 20 to close. As a consequence, the pressure on the diaphragm unit 11 builds up and forces the reducing valve 6 closed until heat is again required as determined by the thermostat.

Should a higher heat demand exist, the indicator arm 44 may be moved towards H. While this decreases the flow of steam to the diaphragm 13 as the valve head 30 is moved towards its closed position, the flow through the bleeder line 19 is increased as the valve head 31 is moved simultaneously further away from its seat. As a consequence, a lower pressure exists on the diaphragm 11 and the reducing valve 6 is opened wider. Should the opposite heating requirement exist, the arm 44 is moved towards L. This further restricts the flow of steam through the bleeder line 19 with the result that a higher pressure exists on the diaphragm 11 with a corresponding closing of the reducing valve 6 resulting.

In the embodiment of my invention shown in the drawings, I have shown a bleeder conduit 47 in communication with the interior of the valve body 17 and connected to the bleeder line 19 to by pass the valve 20. A pressure relief valve 48 controls the conduit 47 and is set to protect the diaphragm from injurious pressures when the valve 20 is closed. Such a pressure relief valve controlled conduit is necessary only when pressures in the supply line 5 are or may be too high for safe use in the operation of the pressure operable unit and, obviously, instead of relieving pressures into the low pressure line 7, the conduit 47 may be disposed to discharge into a sump or a convenient sewer.

As stated, a particular objective of my invention is to provide an adjustable control that will automatically operate the reducing valve in response to heating requirements and that may be located where desired so that the reducing valve may be conveniently controlled from a distance. While the frictional resistance offered by relatively long conduits of small diameter is a factor limiting the distance to which the valve 17 may be spaced from the reducing valve 6, in all instances they may be made conveniently accessible and in many installations will enable the control to be effected from the engineer's office. For convenience, I have omitted steam traps which in most instances are necessary to bleed excess condensate from the conduits 18 and 19 to ensure proper functioning of the control.

From the foregoing, it will be apparent that a control for a heating system, in accordance with my invention, is of a simple construction adapted to give efficient and reliable operation through a wide range of operating conditions with minimum service requirements while having the advantage that it may be located where desired for convenience in adjustment in establishing the desired operation of the reducing valve which it remotely controls.

What I therefore claim and desire to secure by Letters Patent is:

1. A control for a heating system having a reducing valve establishing high and low pressure sides thereof, said control comprising means yieldably maintaining said valve open, a pressure operable unit to close said valve against the action of said yieldable means, a valve body, first and second control conduits in communication with the interior of said body, the first of said conduits, when connected to said high pressure side admitting high pressure steam into said body, and a second of said conduits constituting a bleeder line, when connected to said low pressure side, a shut-off valve in control of said second control conduit, a third conduit in communication with said unit and the interior of said body, and valve means in control of said first and second control conduits, said valve means being interconnected so that when one of them is moved to increase the steam volume that may flow through one control conduit, the other valve means is moved to decrease the flow through the other control conduit, an operator control for said valve means to set and hold them in any one of a plurality of partially opened positions thereby to establish and maintain an operating pressure on said unit to adjust the pressure in said low pressure side, said valve in said bleeder line being operable to block the flow of steam under pressure therethrough, thereby to effect a pressure build-up on said unit to close said reducing valve.

2. The control means of claim 1 in which the junction of the first and second control conduits with the valve body establishes a pair of alined seats, the valve is slidably mounted in the body in alinement therewith and includes a pair of oppositely disposed valve heads, a crank rotatably supported by the body is connected to the valve so that when turned in either direction one of the valve heads is moved towards its adjacent seat and the other valve head is moved away from its seats, an operating handle on the crank exteriorly of the body and including a locking element, and an arcuate disposed series of ribs on the valve body engageable by the locking element to hold the valve in a selected position.

3. A control for a heating system having a reducing valve establishing high and low pressure sides thereof, said control comprising means yieldably maintaining said valve open, a pressure operable unit to close said valve against the action of said yieldable means, a valve body, first and second control conduits in communication with the interior of said body, the first of said conduits, when connected to said high pressure side admitting high pressure steam into said body, and the second of said conduits constituting a bleeder line, when connected to said low pressure side, a shut-off valve in control of said second conduit, and a third conduit in communication with the interior of said body and said unit, valve means in control of said first and second control conduits to regulate the steam volume admitted into said body from said high pressure side thereby to establish an operating pressure on said unit and to regulate the volume of steam flowing through said bleeder line when its valve is open, and an operator actuated control for said valve means to move either of said valve means towards its closed position as it moves the other of said valve means towards its open position and to hold said valve means in their desired position thereby to maintain the operating pressure on said unit, said valve in said bleeder line being operable to block the flow of steam under pressure therethrough thereby to effect a pressure build-up on said unit to close said reducing valve.

4. A control for a heating system having a reducing valve establishing high and low pressure sides thereof, said control comprising means yieldably maintaining said valve open, a pressure operable unit to close said valve against the action of said yieldable means, first and second control conduits in communication with each other, and a third conduit in communication with said control conduits, the first of said conduits being connected to said high pressure side, the second of said conduits constituting a bleeder line connected to said low pressure side, a shut-off valve in control of said second conduit and valve means in control of said first control conduit operable to admit steam to said unit through said third conduit to establish a desired open position of said reducing valve and to said bleeder line, valve means in control of said bleeder line when its valve is open thereby to maintain that pressure on said unit and an operator control for simultaneously actuating both of said valve means to move one of them towards its open position as the other is moved towards its closed position and to hold them in any one of a plurality of positions in which each of them is at least partly open, said valve in said bleeder line being operable to block the flow of steam under pressure therethrough, thereby to effect a pressure build-up on said unit to move said reducing valve against the action of said yieldable means into its closed position.

ALDEN ROGERS.

REFERENCES CITED

The following references are of record in the file of this patent:

UNITED STATES PATENTS

| Number | Name | Date |
| --- | --- | --- |
| 900,275 | Fulton | Oct. 6, 1908 |
| 2,013,480 | Sandvoss | Sept. 3, 1935 |
| 2,210,646 | Wheeler | Aug. 6, 1940 |
| 2,222,141 | Denison | Nov. 19, 1940 |
| 2,328,279 | Jones | Aug. 31, 1943 |

FOREIGN PATENTS

| Number | Country | Date |
| --- | --- | --- |
| 864,706 | France | Jan. 27, 1941 |